(No Model.)

W. D. SLAUSON.
BALING PRESS.

No. 333,895. Patented Jan. 5, 1886.

Witnesses
Inventor
Willis D. Slauson.
By his Attorney

UNITED STATES PATENT OFFICE.

WILLIS D. SLAUSON, OF RACINE, WISCONSIN.

BALING-PRESS.

SPECIFICATION forming part of Letters Patent No. 333,895, dated January 5, 1886.

Application filed November 7, 1885. Serial No. 182,131. (No model.)

*To all whom it may concern:*

Figure 1:
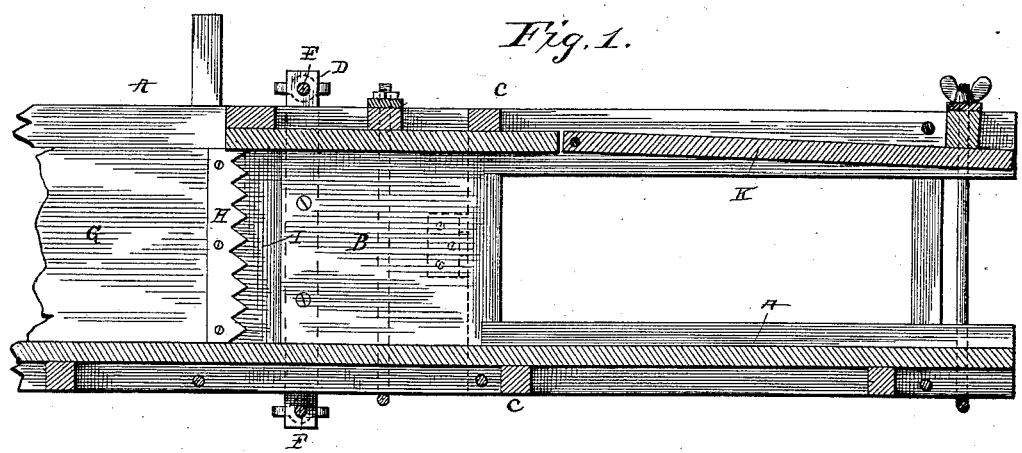
Figure 2:
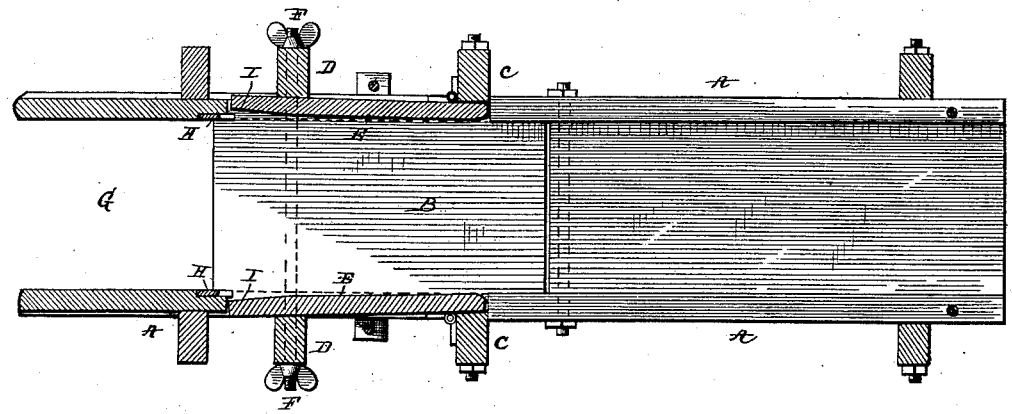

Be it known that I, WILLIS D. SLAUSON, a citizen of the United States, residing at Racine, in the county of Racine and State of Wisconsin, have invented certain new and useful Improvements in Baling - Presses, of which the following is a specification, reference being had therein to the accompanying drawings.
My invention relates to improvements in baling-presses, and is designed to produce a device equally adaptable to damp or dry material, and a means whereby the solidity of the bale may be regulated.
The improvement consists, essentially, in providing a means whereby the distance between the walls of the baling-chamber may be increased in such a manner as to form a wedge, the base of which begins at the end of the feed-chamber, while at no time are the said walls contracted to bring them within the normal size of the said baling-chamber, as is the case in some forms of bale-chambers, thereby increasing the necessitated power.
In the drawings, Figure 1 represents a longitudinal vertical section of that portion of a baling - press containing my improvements, and Fig. 2 a longitudinal horizontal section of the same.
The main frame A has on each side of the bale-box B the vertical timbers C and D, the latter extending above and below the said bale - box, but unconnected therewith. The sides E of bale-box B are hinged at their rear ends to the timbers C in such manner as to permit their forward ends being thrown or moved outward. Near the free ends of said sides E are secured the said timbers D, the upper and lower ends of which are secured together by the clamp - rods F, which latter are employed for adjusting the travel of said sides E.

At the end of the feed-chamber G are secured plates H, with toothed rear edges that prevent the return of the bale after the retraction of the follower. The front ends of the sides E have their inner portions beveled or chamfered, as shown at I, so that when flush with the sides of the feed-chamber G the teeth on the plates H may act. Beyond the sides E the bale-box may be open, and the top K is hinged or pivoted at its front end, so that when slightly pressed down it will prevent the bales expanding longitudinally when being tied. When damp material is to be pressed, the sides are so placed as to make the bale - box about the same size throughout. When dry material is used, the front ends of said sides are carried outward, so that the natural elasticity of the material will cause it to spread laterally and fill the said box, the toothed plates preventing any retrograde movement as the follower is drawn away. When the follower again advances, the material in the bale-box is contracted as it is forced along the sides, which are then so set as to act as a wedge, and enters that portion of the said box, where it is tied. This operation does not decrease the size of the bale, as in machines that decrease the size of the bale-box, and hence does not require as much applied power to effect the same result, and the expense of construction is less; also the device is under better control than those that contract the rear of the box.

I claim—

1. In a bale-press, a bale-box with sides having the ends nearest the feed-chamber adjustable outwardly for imparting an enlarged wedge shape to said box, substantially as specified.

2. In a bale-press, a bale-box with sides pivoted to permit the ends nearest to feed-chamber to swing outwardly, and clamps connecting said sides and adjusting the swing or travel thereof, substantially as specified.

3. A bale-box having outwardly-swinging sides with the free ends beveled or chamfered, adjusting-clamps retaining said sides in place, and toothed stops for the bale located at the end of the stroke of the plunger and coincident with the beveled ends of the sides, substantially as specified.

In testimony whereof I affix my signature in presence of two witnesses.

WILLIS D. SLAUSON.

Witnesses:
L. R. CLEMENT,
E. C. DEANE.